UNITED STATES PATENT OFFICE 2,657,364

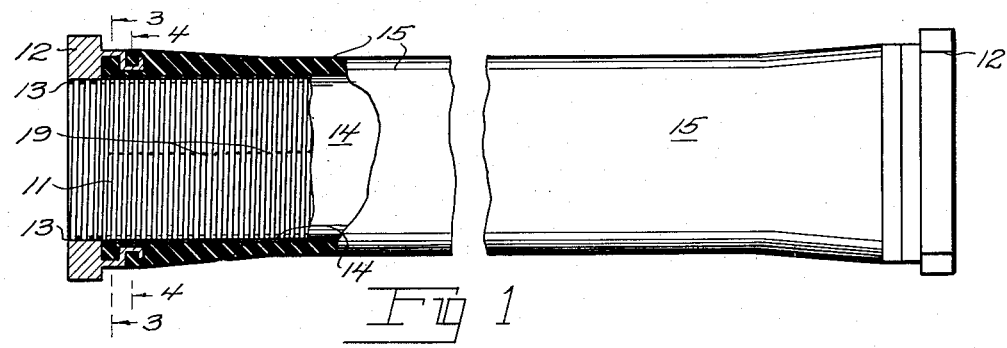
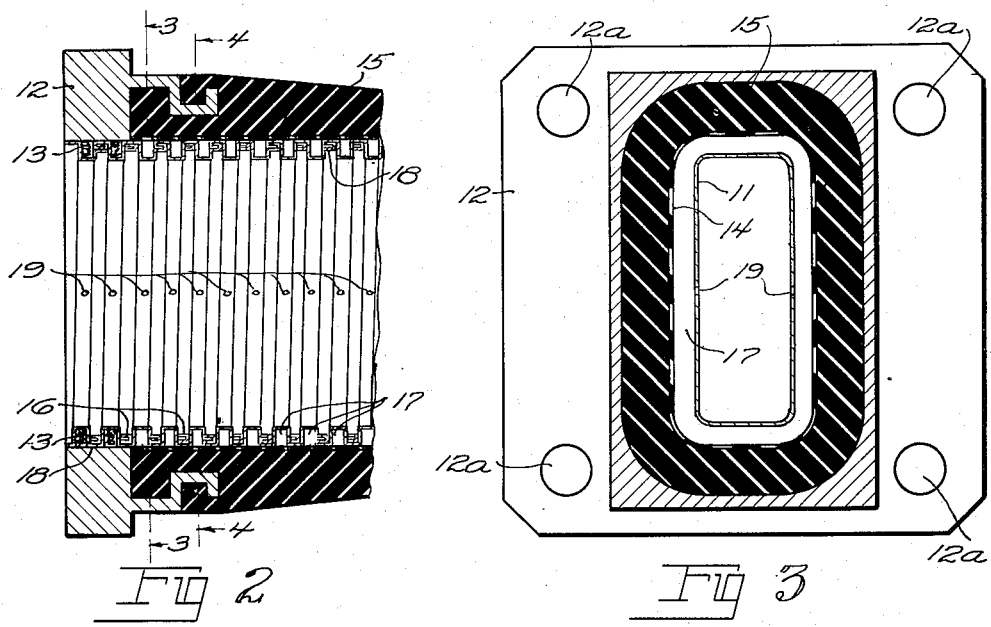
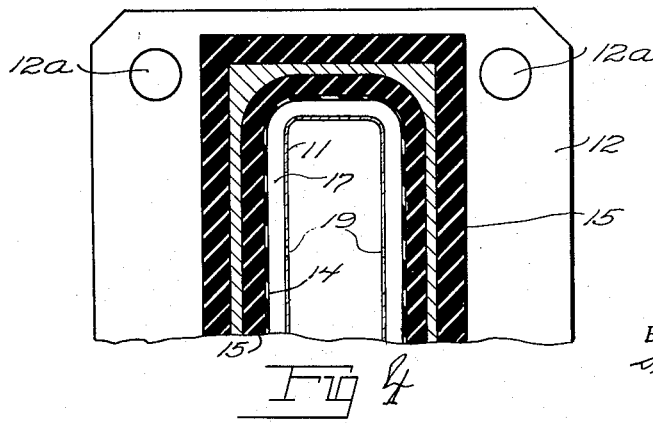
Fig. 1
Fig. 2
Fig. 3
Fig. 4
INVENTOR.
ROBERT S. CARR INVENTOR.
ROBERT S. CARR
BY
Fraser, Myers & Manley
Attorneys

PRESSURE CONTAINING FLEXIBLE WAVE GUIDE

Robert S. Carr, Maplewood, N. J., assignor to Airtron, Inc., Linden, N. J., a corporation of New Jersey Application July 22, 1949, Serial No. 106,181

9 Claims. (Cl. 333—95)

This invention relates to improvements in fluid-pressure-containing, flexible waveguides which are employed to transmit micro-waves between various components of radar apparatus and television equipment and in other equipment in which electrical impulses, usually of high frequency, require conduction between various parts of the apparatus. In some respects, the present invention constitutes improvements over the waveguides disclosed in my earlier application, Serial No. 92,640, filed May 11, 1949.

Waveguides, generally, are in the form of conductive metal conduits which are rectangular in cross-section. Some are rigid, while others are made flexible to facilitate connection between various components of an apparatus.

It has been found that waveguides are more efficient for micro-wave guiding and conduction purposes, if the waveguides and other parts of a wave conduction system are maintained with fluid pressure therein substantially greater than atmospheric pressure. Rigid waveguides can easily be made to contain such higher pressure by making their walls of suitable material and thickness; but flexible waveguides cannot thus easily be adapted for containing high pressures for, to render them flexible they are usually made of relatively thin corrugated material which may bulge outwardly under substantial internal pressure, and such bulging alters their conduction characteristics.

Flexible waveguides are generally provided with a molded jacket of rubber or rubber-like material over the conducting conduit. This jacket serves as an insulation and, according to the disclosure of my mentioned earlier application, it may be so formed and related to other parts of a waveguide as to aid in containing pressure in the latter. According to my mentioned earlier application, the flexible metal core is relied upon as the primary means of containing pressure in the waveguide and an outer jacket is relied upon to oppose bulging of the flexible conducting core and to function as a secondary means for containing pressure in the event of leakage from the core.

Such an arrangement is satisfactory under some conditions, but where the contained pressure is sufficiently high that the core tends to bulge, the outer jacket may likewise bulge to some extent thereby permitting some deformation of the core with consequent objectionable alteration of its conduction characteristics.

An important object of the present invention is the provision of a flexible waveguide which may contain relatively high fluid pressure without altering its predetermined conduction characteristics.

Another important object is the provision of a pressurized flexible waveguide in which its core is substantially free of distortion resulting from contained fluid pressure and, consequently is less likely to become fractured in use.

The foregoing and other objects are achieved, in general, according to this invention, by forming the thin metal, conducting core with a plurality of apertures in its walls, at relatively closely spaced intervals throughout substantially its entire length. These apertures afford positive avenues of communication for fluid pressure from within the core to the exterior thereof. Furthermore, according to this invention, an outer, fluid-impervious, flexible, insulating jacket is provided about the core and fluid-tightly connected to opposite ends thereof, without however being necessarily adherent to the core, at intermediate areas thereof. The jacket is made sufficiently strong, by reinforcing means if necessary, so that it, alone may contain the pressure, without bulging to such an extent as to become objectionably large in diameter. Thus, the fluid pressure, applied outwardly upon the inner surfaces of the walls of the core, is to about the same extent, applied inwardly upon the core's outer wall surfaces. In this balanced pressure condition, the core is not distorted by the contained pressure.

The present invention may, of course, be employed in various structures, of which several embodiments are illustrated in the accompanying drawings. It should be understood that the structures shown in these drawings are selected only for illustrative purposes and that the present invention is not limited to those particular structures.

In the drawings:

Figure 1 is a side elevational view, partly in central axial section, of a flexible waveguide according to the present invention.

Fig. 2 is an enlargement of the left end portion of Fig. 1.

Fig. 3 is a cross-sectional view at one flanged end of the said waveguides, the section being substantially on the line 3—3 of Figs. 1 and 2.

Fig. 4 is a cross-sectional view at one flanged end of the said waveguide, the section being substantially on the line 4—4 of Figs. 1 and 2.

Figure 5:
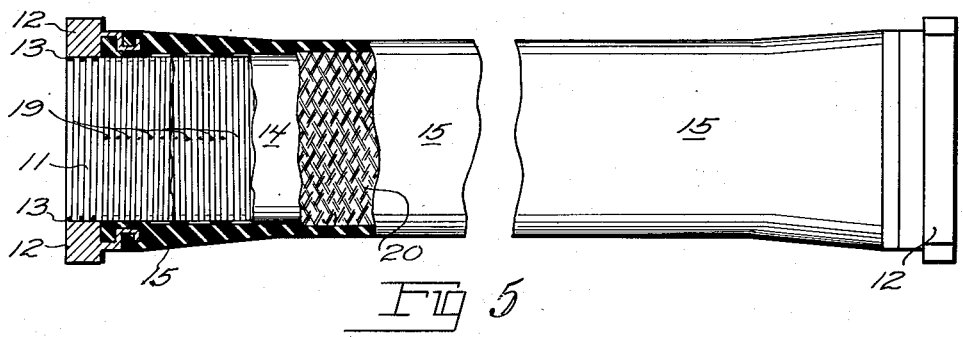
Figs. 5, 6 and 7, are views of the same general character as Fig. 1, but showing modified forms of waveguides according to this invention.

The waveguide illustrated in Figs. 1–4 inclusive, consists of a flexible conducting core 11, and connection elements in the form of connecting flanges 12, fluid-tightly fixed, as by soldering 13, to opposite ends of the core. These flanges may be formed with bolt holes 12a to facilitate connection of the waveguide between other parts of an apparatus in which it is employed. Intimately surrounding the core, is a relatively thin sheath 14 which extends from a point near one end of the core to a point near the latter's other end; and, intimately surrounding the said sheath, is a fluid-impervious, flexible, insulating jacket 15 which is fluid-tightly associated, at its opposite ends, with the connecting flanges 12.

The core 11 is a conduit of generally rectangular cross-section, which may be formed with peripherally extending corrugations or convolutions having an interior recess or recesses 16 and an exterior recess or recesses 17. The core 11, illustrated in the drawing, is formed by spirally winding a longitudinally pre-grooved strip of thin, flexible, electrically conductive metal upon a rectangular arbor, so that adjacent turns of the strip interlock to form a continuous spiral seam 18. This seam is preferably soldered throughout its entire length to improve the longitudinal conduction capacity of the core. This means of forming the core is well known in the art. The flexibility of the core arises from the mentioned corrugations which readily deform to permit flexing of the wave guide as desired.

It has been found that micro-waves of electrical energy pass along longitudinal conducting paths at opposite sides of a longitudinal plane including central longitudinal lines at opposite larger sides of the core. The core portions at or immediately adjacent to said plane, however, are relatively non-conducting or neutral; and along this neutral area, along either or both of the broader sides of the core, are formed apertures 19 which, preferably, are located in the portions of the core wall which define the bottoms of some or all of the exterior recesses 17.

The sheath 14 may be of thin rubber or rubber-like material, and, for convenience in application, may be tubular and may be slid or rolled onto the core 11 before the connecting flanges 12 are applied thereto. The sheath, however, may be of other thin pliant material such as tin or aluminum foil and may be wrapped around the core either before or after the application of the connecting flanges thereto. The sheath material should preferably be such that, under the heat and pressure involved in applying the jacket 15, the sheath material and/or the jacket material will not adhere to the core to any material extent and, more particularly, will not adhere firmly to the core surfaces within recesses 17. The sheath 14 also functions as a barrier so that neither its material nor the jacket material may enter the apertures 19 to any material extent. Ordinarily, the sheath and jacket material extend at least partly into the recesses 17, thereby distributing the flexing of the core 11 along substantially its entire length.

Under the aperture and sheath arrangement, just described, fluid pressure within the waveguide is applied substantially equally to the interior and exterior surfaces of the flexible portions of the core 11 and, therefore, the pressure cannot cause any bulging or other undesirable transverse deformation of the core which would alter its conduction characteristics. The disposition of the apertures 19 at the bottom of the exterior recesses 17 not only minimizes the possibility of the material of the sheath 14 or the jacket 15 entering and closing them but also enables the fluid pressure to enter readily the recess or recesses 17 and expand the sheath and jacket at least slightly so that the outside core areas at the seam 18 are accessible for the pressure to be inwardly effective thereagainst in order to maintain complete equilibrium between the pressure as applied both inwardly and outwardly upon the core. However, even if the expansion of the sheath and jacket is not sufficient to expose the outside of the seam 18 to the fluid pressure, that seam, being folded into several thicknesses of the core material, is inherently able to withstand internal pressure without bulging.

It is recognized that where a fluid-tight core is employed, as disclosed for example in my mentioned earlier application, air leaks might develop in the core. In the absence of the presently described arrangement, however, the leaking air ordinarily would establish fluid pressure upon the exterior of the core only in the immediate vicinity of the leak or along a relatively limited or narrow path along which the leaking air might attempt to find its way to the outer atmosphere; hence such leaking air would not have the equalizing and non-bulging effects of the present invention wherein the pressure is effective over all or most of the outer surface of the core. However, if the circumferential seam of the core is not soldered, or is purposely left unsoldered at some points, or is poorly soldered, or if the core in any way is not leak-proof, the present arrangement, wherein the materials immediately surrounding the core are non-adherent thereto, will bring about equalization of pressure both internally and externally of the core to prevent distortion of the latter.

An advantage of the present invention is that, by deliberately substantially equalizing the pressure applied outwardly and inwardly upon the core, the pressure does not exert any tendency to strain or fracture the core, so that the latter's conductivity is fully preserved, particularly along the mentioned longitudinal conducting paths.

The jacket 15, of course may be so designed and constituted as to enable it to contain the pressure to be carried in the waveguide without excessive bulging or bursting. To this end, it may be made of substantial thickness or may have reinforcing fabric or other reinforcing means incorporated therewithin.

The modified form of waveguide, illustrated in Fig. 5, differs from the waveguide of Figs. 1–4 inclusive, in including also an additional sheath 20 of braided wire or cord, braided intimately over the sheath 14. The sheath 20 can be braided upon the inner sheath 14 in a manner well understood in the art, and, if the jacket 15 is molded on, as is customary, the jacket material flows, to some extent, between and around the braided wires or cords. This sufficiently associates the braided sheath with the jacket to reinforce the latter for containing fluid pressure, and the braided sheath also supplements the sheath 14 in preventing the jacket material from entering the apertures 19 to any material extent. In the waveguide illustrated in Fig. 5, the hereinbefore described substantial balance of pressure is present upon the interior and exterior surfaces of the core, with the mentioned advantages flowing therefrom.

Figure 6:
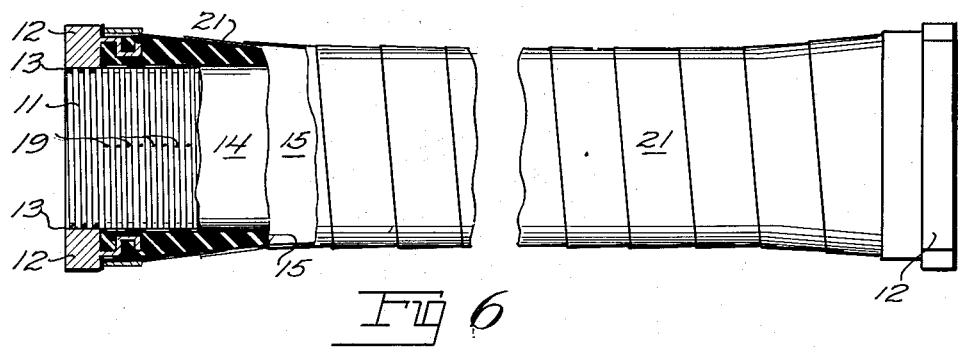

The modified form of waveguide, illustrated in Fig. 6, differs from the waveguide of Figs. 1-4 inclusive, only in having, also, an outer sheath 21 in the form of a tape which is substantially non-stretchable and is spirally wound upon the jacket 15 to reinforce the latter so that it can withstand relatively substantial contained pressure. The tape forming said outer sheath may be of fabric or other suitable, flexible material. Also, the outer sheath 21, instead of being in the form of wound tape, may be a braided sheath much like sheath 20.

Figure 7:
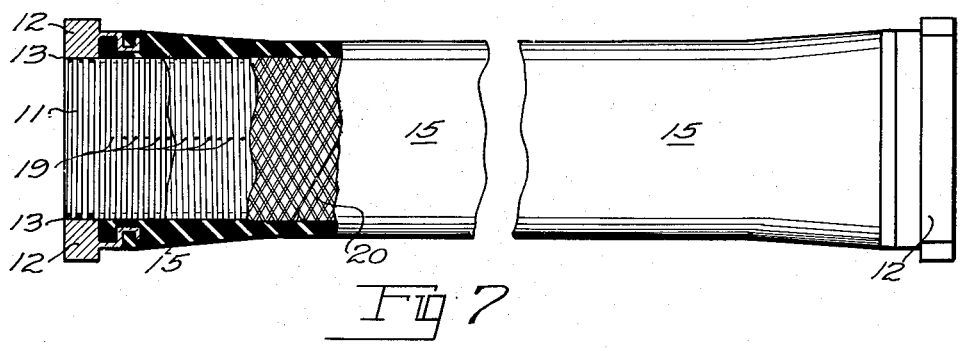

The modified form of waveguide, illustrated in Fig. 7, differs from the waveguide of Fig. 5 in that the sheath 14 is omitted; and the sheath 20 functions as the sole structural barrier against entry of the jacket material into the apertures 19. To serve this purpose, it may be necessary to braid the sheath 20 somewhat more closely into a finer weave than would be necessary in a structure where a sheath like sheath 14 is employed. The sheath 20, in the structure of Fig. 7, functions also as a reinforcing means for the jacket 15, enabling the latter to withstand relatively high contained pressure.

It will be seen that waveguide structures as herein disclosed and described achieve the stated objects very satisfactorily. Waveguides according to this invention are capable of containing substantial fluid pressure while, nevertheless, being capable of flexing to facilitate installation. They are designed to minimize the possibility of becoming fractured in service. The waveguide jacket may expand to some extent although such expansion may be kept within permissible limits; but expansion of the waveguide core is inhibited, thereby maintaining the waveguide's predetermined conduction characteristics.

It should be apparent that the present inventive concept may be employed in various structures other than those described and illustrated herein, without departing from the invention as set forth in the accompanying claims.

What I claim is:

1. A flexible waveguide comprising a spirally-corrugated, tubular, rectangular, electromagnetic micro-wave propagating core of spirally-wound, electrically-conductive, flexible, strip material of which the successive turns are joined along a continuous, interlocked, substantially fluid-tight, spiral seam extending along the radially outermost part of the spiral corrugations of the core, a sheath of flexible sheet material surrounding said core in intimate relation to said seam, connection elements, fluid-tightly fixed to opposite ends of said core, and a flexible, fluid-impervious jacket surrounding said sheath and fluid-tightly joined to both said connection elements; the core being formed with one or more apertures extending through the strip material in the radially innermost part of the said corrugations, the greatest diameters of said apertures being no greater than the width of one of said corrugations at any one point therealong, and the said sheath constituting a barrier between the jacket and said apertures, substantially to prevent jacket material from entering and closing said apertures; fluid communication thereby being maintained through said apertures, between the interior and exterior of the core to substantially equalize the fluid pressure upon the walls of the core.

2. A flexible waveguide comprising a tubular, cross-sectionally rectangular, substantially gas-impervious, electromagnetic microwave propagating core having axially spaced, transverse corrugations enabling it to be flexed, and a gas-impervious, flexible jacket surrounding said core in non-adherent relation to substantial outer surface portions thereof and gas-tightly associated with the core at the jacket's opposite ends; the said core having a passage through a wall thereof affording gas communication between the interior and the exterior of the core to substantially equalize the gas pressure acting upon the inside and outside surfaces of the core and the greatest diameter of said passage being no greater than the space between adjacent corrugations of the core.

3. A flexible waveguide according to claim 2, the said corrugations defining exterior recesses and the core having a plurality of such passages in the vicinity of the bottoms of said recesses.

4. A flexible waveguide according to claim 2, further including a flexible sheath between the jacket and the core for preventing ingress of the material of the jacket into said passage and being in non-adherent relation to the core to admit gas between said core and jacket.

5. A flexible waveguide according to claim 2, the said passage being in the radially innermost portion of a corrugation of said core.

6. A flexible waveguide according to claim 2, the said passage being a leakage breach in the core.

7. A flexible waveguide according to claim 2, a plurality of said passages being provided at lines extending centrally and longitudinally of opposite larger sides of the core.

8. A flexible waveguide according to claim 2, further including a flexible, substantially non-expansible sheath between the jacket and the core for opposing ingress of the material of the jacket into said passage, said sheath being in non-adherent relation to the core to admit gas between said core and jacket and in adherent relation to the jacket to reinforce the latter to enable it to withstand internal pressure.

9. A flexible waveguide according to claim 8, said sheath being of finely braided metal wire at least partially embedded in the inside face of the wall of the jacket.

ROBERT S. CARR.

References Cited in the file of this patent

UNITED STATES PATENTS

| Number | Name | Date |
|---|---|---|
| 1,198,392 | Brinkman | Sept. 12, 1916 |
| 2,050,991 | Atkinson | Aug. 11, 1936 |
| 2,085,563 | Aime | June 29, 1937 |
| 2,479,288 | Allen | Aug. 16, 1949 |
| 2,552,489 | Lawson | May 8, 1951 |
| 2,576,835 | Hewitt | Nov. 27, 1951 |

OTHER REFERENCES

Publication, "Microwave Transmission Design Data," published by the Sperry Gyroscope Company, Publications Dept., Great Neck, Long Island, N. Y., May 1944, pp. 59-67. (Copy in Div. 69.)